United States Patent
Lawrence et al.

(10) Patent No.: US 12,050,552 B2
(45) Date of Patent: Jul. 30, 2024

(54) MAINTAINING BLOCK LEVEL SNAPSHOTS USING FREE STORAGE SPACE

(71) Applicant: Google LLC, Mountain View, CA (US)

(72) Inventors: Paul D. Lawrence, San Jose, CA (US); Mark Gregory Salyzyn, Orlando, FL (US)

(73) Assignee: Google LLC, Mountain View, CA (US)

( * ) Notice: Subject to any disclaimer, the term of this patent is extended or adjusted under 35 U.S.C. 154(b) by 567 days.

(21) Appl. No.: 17/278,797

(22) PCT Filed: Oct. 3, 2018

(86) PCT No.: PCT/US2018/054234
§ 371 (c)(1),
(2) Date: Mar. 23, 2021

(87) PCT Pub. No.: WO2020/072052
PCT Pub. Date: Apr. 9, 2020

(65) Prior Publication Data
US 2022/0100704 A1 Mar. 31, 2022

(51) Int. Cl.
*G06F 16/11* (2019.01)
*G06F 3/06* (2006.01)
(Continued)

(52) U.S. Cl.
CPC ............ *G06F 16/128* (2019.01); *G06F 3/064* (2013.01); *G06F 3/0659* (2013.01); *G06F 3/0679* (2013.01)

(58) Field of Classification Search
CPC ...... G06F 16/128; G06F 3/064; G06F 3/0659; G06F 3/0679
See application file for complete search history.

(56) References Cited

U.S. PATENT DOCUMENTS

| 7,593,978 B2 | 9/2009 | Schulte et al. |
| 8,364,924 B2 * | 1/2013 | Belluomini ......... G06F 12/0868 |
| | | 711/E12.008 |

(Continued)

FOREIGN PATENT DOCUMENTS

| CN | 101520743 A | 9/2009 |
| CN | 101661415 A | 3/2010 |

(Continued)

OTHER PUBLICATIONS

Xiao, Weijun, et al. "Design and analysis of block-level snapshots for data protection and recovery." IEEE Transactions on Computers 58.12 (2009): 1615-1625Xiao, Weijun, et al. "Design and analysis of block-level snapshots for data protection and recovery." IEEE Transactions on Computers 58.12 (2009) (Year: 2009).*

(Continued)

*Primary Examiner* — Mohsen Almani
(74) *Attorney, Agent, or Firm* — McDonnell Boehnen Hulbert & Berghoff LLP

(57) ABSTRACT

A processor of a computing device is described that intercepts a write command output from a file system, the write command specifying new data to be written to a particular group of blocks of a storage device. The processor determines, based on a record of free blocks of the storage device, that the particular group of blocks of the storage device include one or more free blocks that are currently storing snapshot data as old data. Responsive to determining that the particular group of blocks of the storage device include one or more free blocks that are currently storing snapshot data as old data, the processor moves the old data to other free blocks of the storage device, and after moving the old data to the other free blocks, the processor forwards the write command to the storage device to write the new data to the particular group of blocks.

20 Claims, 3 Drawing Sheets

(51) Int. Cl.
*G06F 16/17* (2019.01)
*G06F 16/18* (2019.01)

(56) References Cited

U.S. PATENT DOCUMENTS

| | | | |
|---|---|---|---|
| 8,706,833 B1* | 4/2014 | Bergant | G06F 16/1756 709/215 |
| 9,003,138 B1* | 4/2015 | Natanzon | G06F 9/46 707/634 |
| 2004/0133602 A1 | 7/2004 | Kusters et al. | |
| 2012/0110281 A1 | 5/2012 | Green et al. | |
| 2014/0074776 A1 | 3/2014 | Green et al. | |
| 2014/0258657 A1 | 9/2014 | Schott et al. | |
| 2016/0098413 A1* | 4/2016 | Stephenson | G06F 3/065 707/639 |
| 2016/0239210 A1 | 8/2016 | Patocka | |
| 2017/0123716 A1* | 5/2017 | Erdmann | G06F 3/0604 |
| 2018/0107674 A1 | 4/2018 | Cantwell et al. | |

FOREIGN PATENT DOCUMENTS

| | | |
|---|---|---|
| CN | 102971698 A | 3/2013 |
| EP | 3168737 | 5/2017 |
| WO | 2020072052 | 4/2020 |

OTHER PUBLICATIONS

Allen, Benjamin S. "Zackup, a scalable centralized backup service". Rochester Institute of Technology, 2010 (Year: 2010).*

"International Preliminary Report on Patentability", Application No. PCT/US2018/054234, dated Mar. 23, 2021, 9 pages.

"International Search Report and Written Opinion", PCT Application No. PCT/US2018/054234, dated Dec. 7, 2018, 15 pages.

* cited by examiner

MAINTAINING BLOCK LEVEL SNAPSHOTS USING FREE STORAGE SPACE

RELATED APPLICATION

This application is a national stage entry of International Application No. PCT/US2018/054234, filed Oct. 3, 2018, the disclosure which is incorporated herein by reference in its entirety.

BACKGROUND

A computing system may maintain historical records (so called "snapshots") of the state of data, for example, for subsequent recovery or retrieval of the data. Some systems maintain snapshots of data on the same storage device(s) where the original data is located. Other systems may utilize additional storage device(s) to maintain snapshots of data on separate storage device(s) from where the original data is located. Whether stored on a same or different storage device from where the original data is located, preserving snapshots in this way can cause the amount of available storage space to fill up quickly, causing reduced system performance and/or user frustration and dissatisfaction.

SUMMARY

In general, techniques of this disclosure may enable a computing device to maintain snapshots of data associated with a file system without sacrificing available storage space in an underlying storage device. The techniques may enable the computing device to intercept trim commands to determine free space associated with a file system as well as to keep a record of file system transactions in such a way that they can be reversed later. For example, a computing device, such as a mobile phone, may include a storage device, such as a solid-state drive (SSD), a heat assisted magnetic recording (HAMR) device, a microwave assisted magnetic recording (MAMR) device, or other suitable storage medium, for storing data associated with a file system. To maintain integrity of the file system or to provide a historical accounting of the file system data, over time, the computing device maintains block-level snapshots of the data associated with the file system. Rather than using additional capacity of the storage device, beyond what is already assigned to the file system, for preserving the snapshots, the example computing device maintains the snapshots in so-called "free blocks". The term "free block", as used herein, represents a block of storage space, which a file system (or other program or application) has indicated (e.g., via trimming, based on the file system's internal structures) as not being used, but for purposes of maintaining snapshots and unknown to the file system, can be used to store snapshot data. Even though free blocks may be used to store snapshot data, to the file system, the free blocks appear as "unused" and free from any valid data. As a result, any free blocks may appear, to a user of the file system, as available storage of the computing device.

The computing device may automatically rearrange snapshots by moving the snapshots to different free blocks if, for example, the file system subsequently tries to read or write to a free block, i.e., a block that the file system previously trimmed from the file system's control. Block devices, including SSDs, can better manage themselves (e.g. wear leveling) if the block devices know which blocks are unused by the overlying file system. Thus a trim command was developed to allow a file system to signal or otherwise indicate to the block device that a specific location (e.g., a sector or range of sectors) is unused. In this way, an example computing device can maintain snapshots of data associated with a file system, without requiring the file system to manage the snapshots and using portions of the storage device the file system has marked as being available to store data. By not requiring the file system to manage the snapshots and by using portions of the storage device that the file system has marked as being "free," the described techniques may transparently enable snapshotting, thereby improving system integrity and usability. Further, because the snapshots are managed transparently to a user of the computing device, the user may not try to restrict the amount of storage space set aside for snapshots, thereby allowing additional snapshots to be stored, which may increase the likelihood of a successful restore operation using the stored snapshots.

In one example, a method is described that includes intercepting, by at least one processor, a write command output from a file system of a computing device, the write command specifying new data to be written to a particular group of blocks of a storage device of the computing device; determining, based on a record of free blocks of the storage device, that the particular group of blocks of the storage device include one or more free blocks of the storage device that are currently storing snapshot data as old data; responsive to determining that the particular group of blocks of the storage device include one or more free blocks of the storage device that are currently storing snapshot data as old data, moving, by the at least one processor, the old data to other free blocks of the storage device; and after moving the old data to the other free blocks, and forwarding, by the at least one processor, the write command to the storage device to cause the storage device to write the new data to the particular group of blocks.

In another example, a computing device is described that includes a storage device and at least one processor. The at least one processor is configured to: intercept a write command output from a file system of a computing device, the write command specifying new data to be written to a particular group of blocks of a storage device of the computing device; determine, based on a record of free blocks of the storage device, that the particular group of blocks of the storage device include one or more free blocks of the storage device that are currently storing snapshot data as old data; responsive to determining that the particular group of blocks of the storage device include one or more free blocks of the storage device that are currently storing snapshot data as old data, move the old data to other free blocks of the storage device; and after moving the old data to the other free blocks, forward the write command to the storage device to cause the storage device to write the new data to the particular group of blocks.

In another example, a computer-readable storage medium is described having instructions that, when executed, cause at least one processor of a computing device to: intercept a write command output from a file system of a computing device, the write command specifying new data to be written to a particular group of blocks of a storage device of the computing device; determine, based on a record of free blocks of the storage device, that the particular group of blocks of the storage device include one or more free blocks of the storage device that are currently storing snapshot data as old data; responsive to determining that the particular group of blocks of the storage device include one or more free blocks of the storage device that are currently storing snapshot data as old data, move the old data to other free blocks of the storage device; and after moving the old data to the other free blocks, forward the write command to the storage device to cause the storage device to write the new data to the particular group of blocks.

In yet another example, a system is described including means for intercepting a write command output from a file system of a computing device, the write command specifying new data to be written to a particular group of blocks of a storage device of the computing device; means for determining, based on a record of free blocks of the storage device, that the particular group of blocks of the storage device include one or more free blocks of the storage device that are currently storing snapshot data as old data; means for responsive to determining that the particular group of blocks of the storage device include one or more free blocks of the storage device that are currently storing snapshot data as old data, moving the old data to other free blocks of the storage device; and means for after moving the old data to the other free blocks, forwarding, the write command to the storage device to cause the storage device to write the new data to the particular group of blocks.

The details of one or more examples are set forth in the accompanying drawings and the description below. Other features, objects, and advantages of the disclosure will be apparent from the description and drawings, and from the claims.

DETAILED DESCRIPTION

Figure 1:
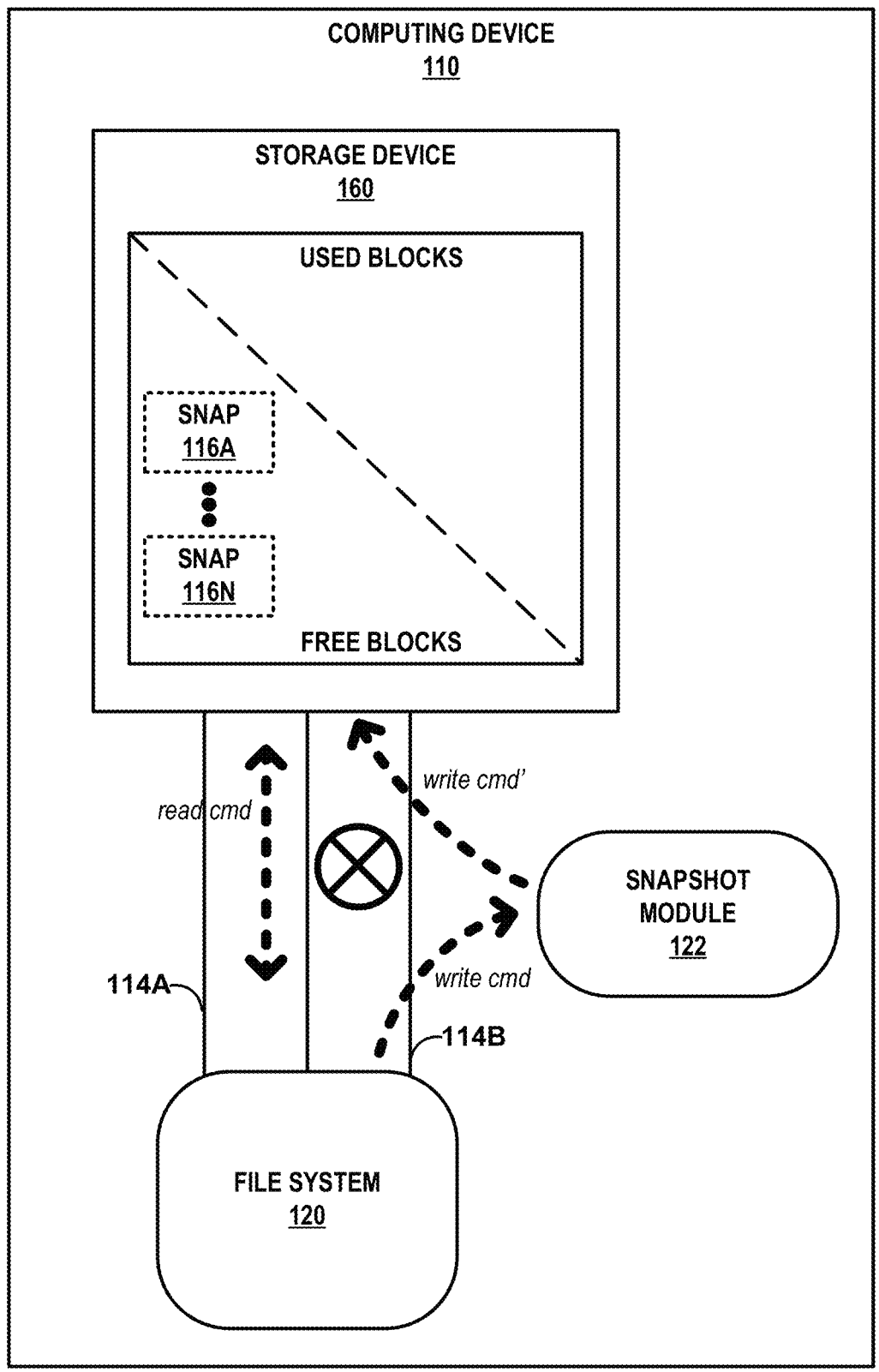
FIG. 1 is a conceptual diagram illustrating an example computing device configured to maintain block-level snapshots of a file system at locations of a storage device that used to, but no longer, contain, valid data, in accordance with one or more aspects of the present disclosure.

FIG. 1 is a conceptual diagram illustrating an example computing device configured to maintain block-level snapshots of a file system at locations of a storage device that used to, but no longer, contain valid data, in accordance with one or more aspects of the present disclosure. Computing device 110 of FIG. 1 represents any computing device that maintains data locally on computing device 110. Examples of computing device 110 include mobile phones, tablet computers, laptop computers, desktop computers, servers, mainframes, wearable devices (e.g., computerized watches, hearables, etc.), home automation devices, assistant devices, gaming consoles and systems, media players, e-book readers, television platforms, automobile navigation or infotainment systems, or any other type of mobile, non-mobile, wearable, and non-wearable computing devices that maintain a file system.

Computing device 110 includes file system 120 and snapshot module 122 operatively coupled, via communication channels 114A and 114B (collectively "communication channels 114"), to storage device 160. File system 120 and snapshot module 122 may perform operations described using software, hardware, firmware, or a mixture of hardware, software, and firmware residing in and/or executing at computing device 110. Computing system 110 may execute file system 120 and snapshot module 122 with multiple processors or multiple devices. Computing system 110 may execute file system 120 and snapshot module 122 as a virtual machine executing on underlying hardware. File system 120 and snapshot module 122 may execute as a service or component of an operating system or computing platform of computing device 110. File system 120 and snapshot module 122 may execute as one or more executable programs at an application layer of a computing platform. While shown as discrete elements distinct from storage device 160, file system 120 and snapshot module 122 may be software stored at storage device 160.

File system 120 maintains information (e.g., data) on behalf of an operating system executing at computing device 110. File system 120 organizes and maintains the information at storage device 160. File system 120 may issue read commands, write commands, and other types of commands to storage device 160. For example, file system 120 may send a read or write command over communication channels 114 that causes storage device 160 to write or read data. In some examples, file system 120 is a YAFFS, JFFS, JFFS2, UBIFS, Log FS, F2FS, ext2, ext3, ext4, HFS, HFS+, FAT32, NTFS, APFS, UFS, or other type of file system that has been designed to work with flash memory storage devices.

Storage device 160 represents any type of storage device configured to maintain data associated with file system 120 as one or more blocks, and enables a file system, such as file system 120, to signal or otherwise indicate, e.g., via trim commands, when blocks that had previously contained valid data, are no longer being used. While primarily described as an SSD, storage device 160, in some examples, may include other types of computer-readable storage media. Examples of storage device 160 include SSDs or other types of storage devices that rely on flash memory, electrically programmable memories (EPROM), or electrically erasable and programmable (EEPROM) memories. Other examples of storage device 160 include HAMR devices, a MAMR devices. Storage device 160 may be configured to store larger amounts of information than volatile memory. Storage device 160 may further be configured for long-term storage of information as non-volatile memory space and retain information after power on/off cycles.

Storage device 160 stores information and provides access to the information during operation of computing device 110. Information stored on storage device 160 may be divided into blocks of data. Each block of data may be divided into multiple pages.

To delete data from a block, some SSDs may need to delete the entire block and then repopulate the block with any pages that were not to be deleted. In other words, the SSD may temporarily relocate any pages that are being retained and not deleted from a target block, to a temporary buffer. Then, after wiping the target block of data, including the pages that are to be deleted, the SSD may repopulate the target block with the data retained in the temporary buffer. Managing blocks and pages of data this way is inefficient and therefore may reduce performance.

To improve performance and extend operational lifespan, other SSDs, such as storage device 160, are configured to perform trimming. Trim commands may enable file system 120 to indicate to storage device 160, which blocks of data are no longer needed.

Also referred to as "TRIM" commands when implemented according to the AT Attachment (ATA) Packet Interface and "UNMAP" commands in the Small Computer System Interface (SCSI), trimming enables SSDs to more efficiently handle garbage collection, which would otherwise slow future write operations to unused blocks.

Rather than temporarily relocate pages to a temporary buffer, the SSD may simply mark a block as no longer having any valid data and during subsequent writes to the block, the SSD will write new data to the block without preserving any old data that remains on the block.

Snapshot module 122 exploits the trimming capabilities of file system 120 and storage device 160 to maintain snapshots of data associated with file system 120. For example, snapshot module 122 identifies when data is changing, records a state the data before the change, and saves the recorded state in case file system 120 has to revert back to the state the data was in before the change. Unlike other snapshot systems that store snapshots alongside the operational data, or other snapshot systems that maintain snapshots on a different storage device than where the operational data is stored, snapshot module 122 preserves data snapshots on the same storage medium that maintains the operational data, and does so without requiring file system 120 to use any additional data storage beyond the data storage that has already been used by file system 120. In other words, snapshot module 122 implements a snapshot system that appears to file system 120 to require no additional storage space. That is, the total storage space taken by file system 120 and the stored snapshots, appear from the perspective of file system 120 to require the same size data footprint that is already attributed to file system 120.

Snapshot module 122 stores snapshots in spaces on storage device 160 that are referred to as "free blocks". For example, storage device 160 includes used and unused blocks. Prior to writing to any blocks at the direction of file system 120, storage device 160 may mark any unwritten blocks as "unused blocks". Storage device 160 may freely write to any unused blocks, upon command, from file system 120. Once written, storage device 160 marks unused blocks as "used blocks" and the blocks remain marked as used blocks until file system 120 otherwise indicates that the used blocks no longer contain valid data and are no longer being used (e.g., via trimming).

However, rather than let storage device 160 learn that a used block is no longer being used to store valid data, snapshot module 122 intercepts signals from file system 120 (e.g., trim commands) to then cause storage device 160 to have "free blocks" for storing snapshots. The term "free block", as used herein, represents a block of storage space, which a file system (or other program or application) has indicated (e.g., via trimming, based on the file system's internal structures) no longer contain valid data, but for purposes of maintaining snapshots and unknown to the file system, can be used to store snapshot data. Even though free blocks may be used to store snapshot data, to the file system, the free blocks appear as "unused" and free from any valid data.

Snapshot module 122 may store snapshots of data associated with file system 120 in these so-called "free blocks" so that the snapshots do not cause file system 120 to take up any more storage space on storage device 160, beyond what has already been used by it. Snapshot module 122 may automatically move snapshots to different free blocks if, for example, file system 120 subsequently tries to write to any free blocks that contain snapshots. In this way, an example computing device can maintain snapshots of data associated with a file system, without decreasing the amount of storage the file system is configured as having available for storing additional data. For example, as shown in FIG. 1, storage device 160 includes used blocks and unused blocks that have been configured as free blocks for storing snapshot 116A ("SNAP 116A") through snapshot 116N ("SNAP 116N") (collectively "snapshots 116").

In operation, each block of storage device 160 may be categorized into one of four states: USED, FREE, BACKUP, CHANGED. Each block of storage device 160 starts in the "used state" indicating that file system 120 maintains valid data in that block. A block moves to the "free state" when file system 120 tries to indicate to storage device 160 that the block is no longer being used by file system 120 to store valid data (e.g., by issuing a trim command). A block is in the "backup state" when after being considered a free block, the block stores snapshot data. A block is in the "changed state" when, after having previously been marked as being in the "free state" or "backup state", file system 120 begins using the block again to store valid data.

Snapshot module 122 may intercept a trim command output from file system 120. The trim command may specify one or more blocks of storage device 160 that are no longer being used by file system 120. As such, snapshot module 122 may classify each of the one or more blocks as "free blocks" to indicate that the blocks are no longer being used to store any valid data. For example, as shown in FIG. 1, snapshot module 122 may disable communication channel 114B between storage device 160 and file system 120 such that all write related commands, including trim commands, being output by file system 120 are first routed through snapshot module 122 without reaching storage device 160. In some examples, disabling communication channel 114B may simply prevent file system 120 from issuing a write command that can directly reach storage device 160, without necessarily preventing storage device 160 from receiving write commands (e.g., from snapshot module 122). In other words, disabling communication channel 114B, in accordance with the described techniques, means that file system 120 is prevented from directly communicating write and trim commands to storage device 160 and instead requires snapshot module 122 to forward such commands after validating their feasibility. As such, snapshot module 122 prevents file system 120 from sending trim or other write commands directly to storage device 160. By intercepting the trim command, snapshot module 122 prevents storage device 160 from disassociating the one or more blocks specified by the trim command from file system 120. That is, according to storage device 160, file system 120 is using the blocks specified by an intercepted trim command, even though file system 120 no longer recognizes the blocks as having any usable or valid data.

After intercepting a trim command, snapshot module 122 takes steps to preserve the information contained in the trim command, e.g., for processing of subsequent write commands. That is, snapshot module 122 may generate a record of free blocks of storage device 160 including an indication of the one or more blocks of storage device 160 that are no longer being used by file system 120. The record of free blocks indicates which blocks of storage device 160 can be used or are being to store snapshots.

At a future time, snapshot module 122 may intercept a write command output from file system 120. The write command may specify new data to be written to a particular group of blocks of storage device 160. For example, file system 120 may output a write command via communication channel 114B.

However, before the write command can reach storage device 160, snapshot module 122 intercepts the write command for further processing. Snapshot module 122 may determine whether the blocks referenced by the write command are listed in the record of free blocks as being free blocks, used blocks, backup blocks, or changed blocks.

If the write command references a backup block (i.e., a free block being used to store snapshot data), snapshot module 122 may reclassify the backup block as a changed block for storing valid data on behalf of file system 120. Snapshot module 122 may take actions to preserve the snapshot data (as discussed in greater detail below) in a different free block, at which point, snapshot module 122 may mark the different free block as being a backup block. Snapshot module 122 may forward the write command, unaltered from how snapshot module 122 received the write command, to storage device 160 to enable storage device 160 to write valid data to the changed block.

If the write command references a free block that is not a backup block, snapshot module 122 may take no action to preserve data stored at the free block, but instead, mark the freeblock as changed and forward the write command on to storage device 160 so that as a changed block, the block may store valid operational data. If however the write command does not reference any backup or free blocks but instead references a used or changed block, then snapshot module 122 may copy old data stored at the block referenced by the write command as snapshot 116A to an existing free block listed in the record. After copying the old data as snapshot data to the existing free block, snapshot module 122 may forward the write command to storage device 160 to cause the storage device to write new data to the block referenced by the write command.

As such, snapshot module 122 preserves the state of data associated with file system 120 within free blocks and therefore without using any additional unused blocks, beyond those which were already being used by file system 120, prior to being trimmed. If for some reason file system 120 needs to revert back to the old data, snapshot module 122 may replace the new data with the old data preserved by snapshot 116A. At which time, snapshot module 122 may update the record of free blocks to indicate a removal of snapshot 116A.

In this way, an example computing device can maintain snapshots of data associated with a file system, without taking up any more storage capacity than what is already used by the file system. By not requiring any additional unused blocks to maintain snapshots of a file system than what is already relied on to maintain the file system, the described techniques may enable more computing devices to implement snapshotting, thereby improving system integrity and usability.

Figure 2:
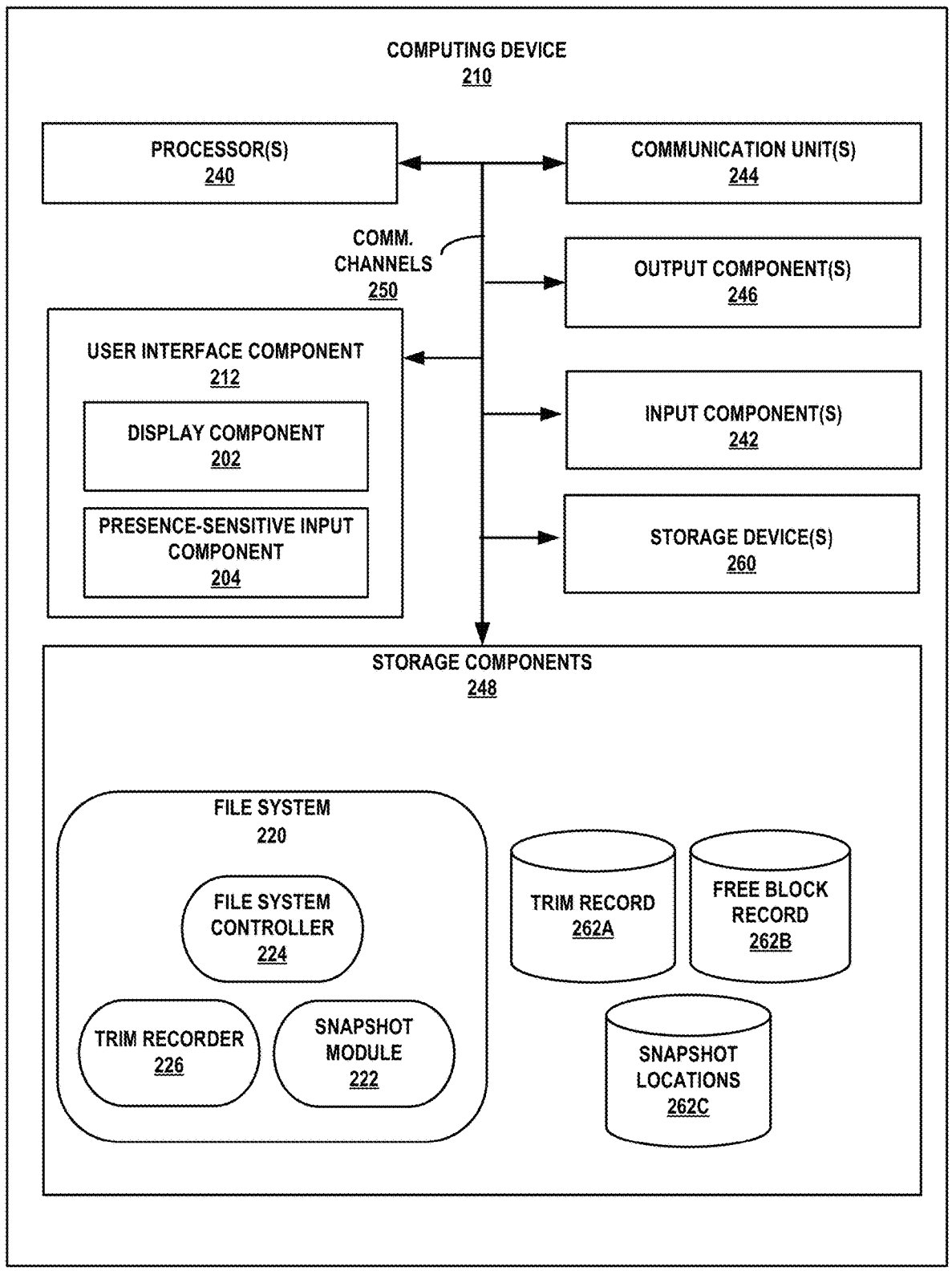
FIG. 2 is a block diagram illustrating an example computing device configured to maintain block-level snapshots of a file system of the computing device, at locations of a storage device that used to, but no longer, contain valid data, in accordance with one or more aspects of the present disclosure.

FIG. 2 is a block diagram illustrating an example computing device configured to maintain block-level snapshots of a file system of the computing device, at locations of a storage device that used to, but no longer, contain valid data, in accordance with one or more aspects of the present disclosure. Computing device 210 of FIG. 2 is an example of computing device 110 of FIG. 1 and is described in the context of computing device 110. Computing device 210 may include some or all of the capabilities of computing device 110. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more input components 242, one or more communication units 244, one or more output components 246, one or more storage components 248, and one or more storage devices 260. UIC 212 includes display component 202 and presence-sensitive input component 204.

Storage components 248 of computing device 210 also includes file system 220, file system controller 224, trim recorder 226, and snapshot module 222. Additionally, storage components 248 include trim record data store 262A, free block record data store 262B, and snapshot locations data store 262C (each of which may exist separately or collectively as one or more data stores). Collectively, data stores 262A-262C may be referred to as "data stores 262".

Communication channels 250 may interconnect each of the components 202, 204, 212, 214, 220, 222, 224, 226, 248, 260, and 262 for inter-component communications (physically, communicatively, and/or operatively). In some examples, communication channels 250 may include a system bus, a network connection, an inter-process communication data structure, or any other method for communicating data.

One or more input components 242 of computing device 210 may receive input. Examples of input are sensor, tactile, audio, and video input. Input components 242 of computing device 200, in one example, includes a presence-sensitive display, touch-sensitive screen, sensor, mouse, keyboard, voice responsive system, video camera, microphone or any other type of device for detecting input from a human or machine. In some examples, input components 242 include one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 246 of computing device 210 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 210 may communicate with external devices via one or more wired and/or wireless networks by transmitting and/or receiving network signals on the one or more networks. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

UIC 212 of computing device 200 includes display component 202 and presence-sensitive input component 204. Display component 202 may be a screen at which information is displayed by UIC 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an (x,y) coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202.

While illustrated as an internal component of computing device 210, UIC 212 may also represent and external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 212. For example, processors 240 on computing device 212 may receive and execute instructions stored by storage components 248 that execute the functionality of modules 220, 222, 224, and 226. The instructions executed by processors 240 may cause computing device 210 to store information within storage components 248 during program execution, for example, at any of data stores 262. Examples of processors 240 include application processors, display controllers, sensor hubs, and any other hardware configure to function as a processing unit. Modules 220, 220, 222, 224, and 226 may be operable by processors 240 to perform various actions or functions of computing device 210.

One or more storage components 248 within computing device 210 may store information for processing during operation of computing device 210 (e.g., computing device 210 may store data accessed by modules 220, 222, 224, and 226 during execution at computing device 210). In some examples, storage component 248 is a temporary memory and in other examples, storage component 248 is a computer-readable storage medium.

As a memory, a primary purpose of storage component 248 may not be configured for long-term storage but rather, may be configured for short-term storage of information as volatile memory and therefore not retain stored contents if computing device 210 is powered off. Examples of volatile memories include random access memories (RAM), dynamic random access memories (DRAM), static random access memories (SRAM), and other forms of volatile memories known in the art. Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, and 226, as well as data stores 262.

Computing device 210 includes one or more storage devices 260, which represent an example of storage device 260. That is, unlike storage devices 248 which may be configured for long- or short-term memory, storage devices 260 is primarily configured for long-term storage; so storage device 260 retains data even after computing device 210 is powered off. Storage device 260 represents any type of storage device configured to maintain data associated with file system 220 as one or more blocks and enables file system 220 to relinquish control over any blocks that have previously been used by file system 220, e.g., via trim commands.

File system 220 may provide similar functionality as file system 120, of computing device 110, shown in FIG. 1. That is, file system 220 may maintain information (e.g., data) on behalf of an operating system executing at computing device 210.

File system controller 224 performs typical file system operations on behalf of file system 220. For example, file system controller 224 may perform all operations associated with maintaining, organizing, and updating data associated with file system 220 that is maintained at storage device 260. File system 224 may issue read commands, write commands, trim commands, and other commands to storage device 260.

Trim recorder 226 of file system 220 intercepts trim and write commands that system controller 224 outputs to storage device 260. Trim recorder prevents the trim and write commands from reaching storage device 260 directly. Instead, trim recorder 226 determines whether an outbound command is a trim or write command. Trim recorder 226 maintains trim record data store 262A as a listing of all trim and write commands that originated from file system controller 224. If not a trim or write command, trim recorder 226 may forward a command on to storage device 260. In response to determining that a command is a trim or write command, trim recorder 226 may add information about the command to trim record data store 262A.

Snapshot module 222 of file system 220 may provide similar functionality as snapshot module 122, of computing device 110, shown in FIG. 1. However, unlike the example of FIG. 1 where snapshot module 122 is shown as a separate component of file system 120, snapshot module 222 is shown as being partially or fully integrated with file system 220. Snapshot module 222 maintains snapshots of data associated with file system 220, on storage device 260. Snapshot module 222 maintains a record of where the snapshots are stored as snapshot locations data store 262C. Snapshot locations data store 262C may store locations of storage device 260 alongside corresponding block identifiers. Snapshot module 222 may query a particular block identifier at snapshot locations data store 262C and in response to the query, obtain a location of storage device 260 at which a corresponding snapshot of the particular block is stored.

Snapshot module 222 may use information contained in trim record 262A and snapshot locations data store 262C to maintain free block record data store 262B. That is, snapshot module 222 may include within free block record data store 262B any block that has previously been referenced in a trim command, and may or may not currently store a snapshot. Free block record data store 262B indicates whether each free block in the record of free blocks is available for a future snapshot or backup and may further indicate if each free block is currently associated with an existing snapshot or backup. When a trim or write command is added to trim record data store 262A, snapshot module 222 may determine whether the command refers to a block that is marked as a "free block" at free block record data store 262B, and if so, whether the block corresponds to a location of an existing snapshot that is stored in one of snapshot locations data store 262C.

For example, if snapshot module 222 receives a trim command that does not refer to any existing "free block" at free block record data store 262B, snapshot module 222 may add the block specified by the trim command as a new block and refrain from forwarding the trim command to storage device 260. If snapshot module 222 receives a write command that does not refer to any existing "free block" at free block record data store 262B, snapshot module 222 may simply forward the write command on to storage device 260 for execution. If, however, snapshot module 222 receives a write command that does refer to an existing "free block" at free block record data store 262B, or if snapshot module 222 receives a write command to overwrite data associated with a block mentioned in snapshot locations data store 262C, snapshot module 222 may move or update one or more snapshots.

For example, in response to a write command that refers to an existing "free block" at free block record data store 262B, or in response to a write to overwrite data associated with a block mentioned in snapshot locations data store 262C, snapshot module 222 may move any snapshots stored at the existing free block to one or more other free blocks indicated in free block record data store 262B. Snapshot module 222 may remove the block from free block record data store 262B and forward the write command on to storage device 260 to cause storage device 260 to execute the write command.

Figure 3:
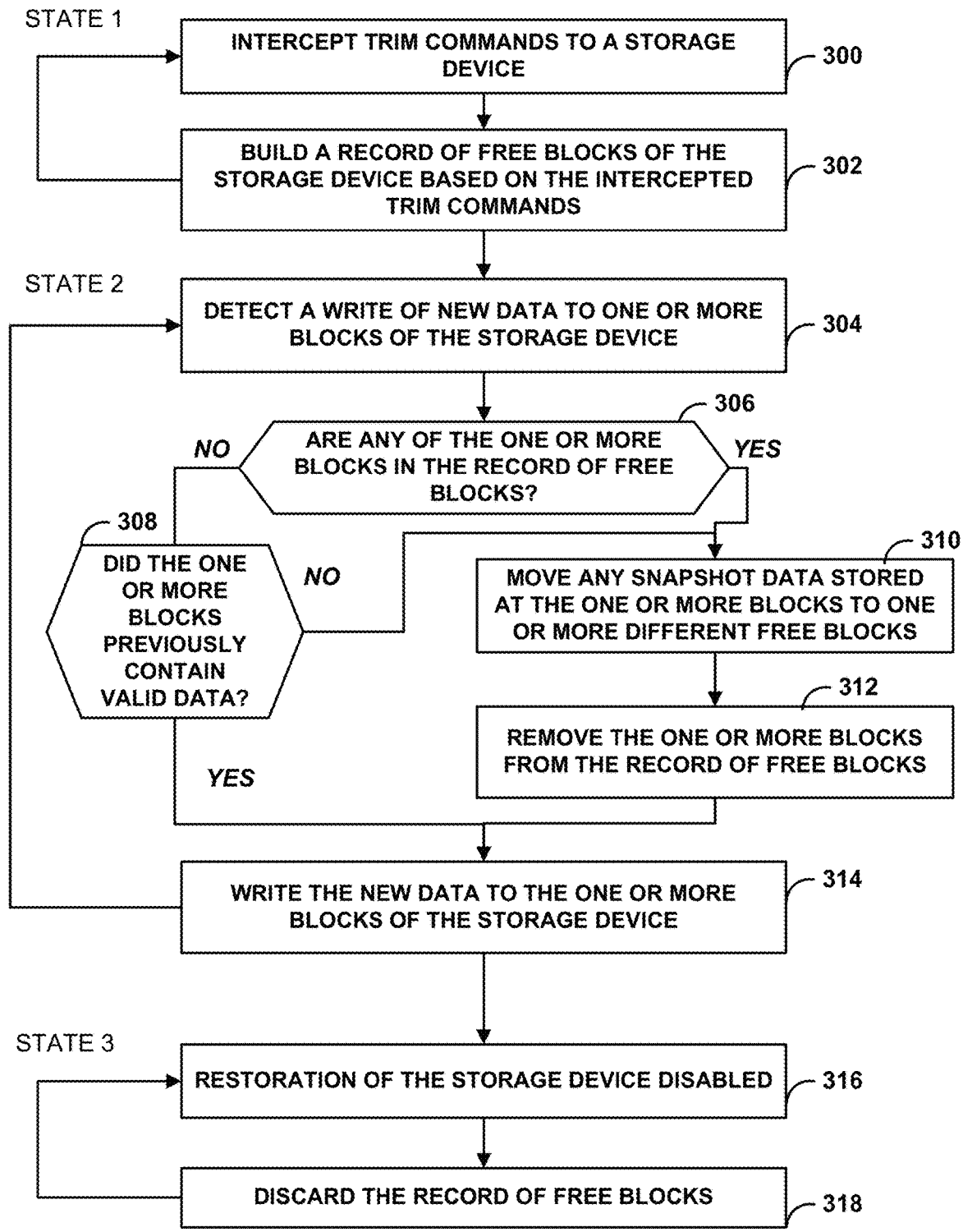
FIG. 3 is a flowchart illustrating example operations of an example computing system configured to maintain block-level snapshots of a file system at locations of a storage device that used to, but no longer, contain valid data, in accordance with one or more aspects of the present disclosure.

FIG. 3 is a flowchart illustrating example operations of an example computing system configured to maintain block-level snapshots of a file system at locations of a storage device that used to, but no longer, contain valid data, in accordance with one or more aspects of the present disclosure. The process of FIG. 3 may be performed by one or more processors of a computing device, such as computing devices 110 and 210. The steps of the process of FIG. 3 may in some examples, be repeated, omitted, and/or performed in any order. For purposes of illustration, FIG. 3 is described below within the context of computing device 210 of FIG. 2.

Consider an example where computing device 210 is undergoing an update to an operating system that includes file system 220. While upgrading the operating system, computing device 210 may take precautions to preserve old data (e.g., user data associated with a previous version of file system 220), e.g., in case of an anomaly from the upgrade. Computing device 210 may create snapshot data of the operating system, user data, or any other old data that may be modified or overwritten during an upgrade so that any old data that was modified or overwritten can subsequently be recovered even if overwritten with new data (e.g., updated operating system data, new user data, etc.). Computing device 210 may snapshot data automatically during upgrades to file system 220 or related features of computing device 210. Computing device 210 may take snapshots of data during upgrades so that the data may be recovered if the upgrade is reversed. Computing device 210 may perform snapshotting without decreasing an amount of storage space that is indicated as being available to file system 220 to store other data.

In operation, computing device 210 may operate in a first state for intercepting trim commands to build a record of free blocks. That is, computing device 210 may intercept trim commands to a storage device (300) and build a record of free blocks of the storage device based on the intercepted trim commands. For example, as trim commands are output from file system controller 224, trim recorder 226 may intercept the trim commands, preventing the trim commands from reaching storage device 260. The trim command may specify one or more "used blocks" of storage device 260 that are no longer being used by file system 220.

From the intercepted trim command, computing device 210 may generate a record of free blocks of the storage device indicating the one or more blocks of the storage device that are no longer being used by the file system (302). For example, trim recorder 226 may create an entry in trim record data store 262A to memorialize that file system controller 224 commanded a trim, while preventing the actual trim command from passing through to storage device 260. Trim recorder 226 may store the block identifiers associated with the trim command and add the block identifiers to free block record 262B for subsequent use as backup blocks that store snapshot data.

After building a record of free blocks, computing device 210 may operate in a second state for maintaining snapshots of data at storage device 260. For example, using free block record 262B as a mapping of available space of storage device 260 that may be used for storing snapshots, computing device 210 may identify used and changed blocks of storage device 260 that store valid data (e.g., user data or other types of data worth preserving before an update). When write commands issued by file system 220, particularly those that refer to used or changed blocks, are intercepted by snapshot module 222, snapshot module 222 may preserve the valid data from the used and changed blocks of storage device 260 as snapshot data stored at free blocks of storage device 260 that do not currently maintain backups. Snapshot module 222 may cause storage device 260 to write the snapshot data to the identified free blocks locations while updating snapshot data locations data store 262C. Snapshot module 222 may mark those free blocks that now store snapshot data as backup blocks.

Once snapshots have been created and stored at backup blocks, computing device 210 may intercept a write command output from the file system (304). The write command may specify new data to be written to a particular group of blocks of the storage device.

Computing device 210 may determine whether any blocks from the particular group of blocks is in the record of free blocks (306), is a backup block, is a used block, or is a changed block. For example, file system controller 224 may output a write command to cause data to be written to a particular block of storage device 260. Snapshot module 222 may intercept the command and compare, from the command, a block identifier of the particular block to free block record 262B.

In response to identifying a particular block within free block record data store 262B (306, YES branch), snapshot module 222 may perform operations to ensure that any snapshots preserved in the particular block are not lost when storage device 260 executes the write command. That is, snapshot module 222 may determine whether there is any snapshot data stored at the particular block based on a lookup of the block within snapshot locations 262C. If the particular block does store snapshot data and is therefore a backup block, snapshot module 222 may move any snapshot data stored at the particular backup block of storage device 260 to a different free block of storage device 260 (310) and update snapshot locations 262C with the new location of the data that was stored at the particular group of blocks. Snapshot moule 222 may then reclassify the backup block as a changed block that after previously being free, now stores valid data. If the particular block does not store snapshot data or is not free, snapshot module 222 may pass the write command to storage device 260 without moving any data.

Computing device 210 may remove the particular block from free block record data store 262B (312). For example, because the particular block is going to be used by file system 220 and will no longer be a free block, snapshot module 222 may remove the entry in free block data store 262B to omit the particular block; the particular block is therefore not used to store snapshot data and can, instead, again store other data associated with file system 220.

In response to not identifying the particular block within free block record 262B (306, NO branch), snapshot module 222 may determine whether the particular block ever previously contained valid data (308). If the particular block had previously contained valid data (308, YES branch) then snapshot module 222 may treat the block as a used block or changed block and simply forward the write command received from file system controller 224 on to storage device 260 for execution without having to move snapshot data or update snapshot locations 262C. That is, when writing data to a used or changed block that is already marked as storing valid data, snapshot module 222 passes the write command to storage device 260 without modification or taking additional steps to preserve the data stored within the block. Alternatively, if the particular block had not previously contained valid data (308, NO branch) then snapshot module 222 may backup any potential snapshot data stored at that particular block, by performing operations 310 and 312 as described above.

Storage device 260 may write the new data to the one or more blocks of the storage device (314). In other words, after moving snapshot data to a corresponding free block or verifying that the write will not impact a free block at which snapshot data is stored, snapshot module 222 may forward the write command received from file system controller 224 to storage device 260 to cause storage device 260 to write the new data to the particular group of blocks.

Computing device 210 may operate in a third state where computing device 210 operates without performing snapshots. Snapshot module 222 may receive instructions from file system 220 to cease preserving snapshots of data stored at storage device 260. For example, responsive to detecting an anomaly with a current version of an operating system currently executing at computing device 210, file system 220 may send a command to snapshot module 222 to recover previous data. In response to the command, and as computing device 210 reverts back to the previous version of the operating system, snapshot module 222 may restore snapshotted data. Specifically, snapshot module 222 may read from storage device 260, snapshots preserved in free blocks of storage device 260. Snap shot module 222 may write data to storage device 260 to recover the previous version by repopulating storage device 260 with old, snapshotted data. Snapshot module 222 may cause storage device 260 to replace the user data associated with the current version of the operating system with the user data associated with the previous version of the operating system, stored as snapshots.

Computing device 210 may disable restoration of storage device 260 (316) and discard the record of free blocks (318). Snapshot module 222 may cease maintaining free block record data store 262B or snapshot locations data store 262C.

In some cases, computing device 210 may rely on snapshots to recover or restore old data. Computing device 210 may restore old data by at least obtaining the old data from the corresponding free blocks, and responsive to obtaining the old data from the corresponding free blocks, outputting a write command to the storage device to cause the storage device to write the old data to the particular group of blocks from which the old data originated. For example, snapshot module 222 may send a read command to storage device 260 to read snapshot data preserved in free blocks. Snapshot module 222 may issue a subsequent write command to cause storage device 260 to then write the old data preserved as snapshots, back at the location from which the old data was originally snapped.

Because computing device 210 utilizes free blocks to store snapshots, e.g., as opposed to utilizing additional storage space of storage device 260 or a different storage device (e.g., a remote storage device in a cloud), computing device 210 may perform operations to ensure that the snapshots are not overridden if, for example, computing device 210 tries to write new data to the free blocks.

For example, after having intercepted and forwarded a first write command to storage device 260, snapshot module 222 may intercept a second, subsequent write command output from file system controller 224 of file system 220. The second write command may specify data to be written to a particular group of blocks of storage device 260. Before forwarding the second write command to storage device 260, snapshot module 222 may determine whether the second write command identifies any free blocks from free block record data store 262B.

Responsive to determining, based on free block record data store 262B, that the second write command identifies at least one at least one free block specified in free block record data store 262B, snapshot module 222 may move any old data stored at the at least one free block to different free blocks of storage device 260. After moving the old data to the different free blocks (and after removing the at least one free block from free block record data store 262B), snapshot module 222 may forward the second write command to storage device 260 to cause storage device 260 to write new data as originally specified in the second write command.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Clause 1. A method, comprising: intercepting, by at least one processor, a write command output from a file system of a computing device, the write command specifying new data to be written to a particular group of blocks of a storage device of the computing device; determining, based on a record of free blocks of the storage device, that the particular group of blocks of the storage device include one or more free blocks of the storage device that are currently storing snapshot data as old data; responsive to determining that the particular group of blocks of the storage device include one or more free blocks of the storage device that are currently storing snapshot data as old data, moving, by the at least one processor, the old data to other free blocks of the storage device; and after moving the old data to the other free blocks, forwarding, by the at least one processor, the write command to the storage device to cause the storage device to write the new data to the particular group of blocks.

Clause 2. The method of clause 1, wherein the write command is a first write command, the method further comprising: restoring, by the at least one processor, the old data to the particular group of blocks by at least: obtaining, by the at least one processor, the old data from the other free blocks; and responsive to obtaining the old data from the other free blocks, outputting a second write command to the storage device to cause the storage device to write the old data to the particular group of blocks.

Clause 3. The method of any of clauses 1-2, wherein the write command is a first write command, the method further comprising: after forwarding the first write command to the storage device, intercepting, by the at least one processor, a second write command output from the file system, the second write command specifying different new data to be written to a different group of blocks of the storage device; responsive to determining, based at least in part on the record of free blocks, that the different group of blocks of the storage device does not include any free blocks of the storage device that are currently storing snapshot data as old data, forwarding, by the at least one processor, the second write command to the storage device to cause the storage device to write the different new data to the different group of blocks.

Clause 4. The method of clause 3, further comprising: responsive to determining, based on the record of free blocks, that the different group of blocks of the storage device does not include any free blocks of the storage device, forwarding, by the at least one processor, the second write command to the storage device to cause the storage device to write the different new data to the different group of blocks.

Clause 5. The method of any of clauses 1-4, further comprising: intercepting, by the at least one processor, one or more trim commands output from the file system; and updating, by the at least one processor, based on the one or more trim commands, the record of free blocks to include any blocks identified in the trim command.

Clause 6. The method of any of clauses 1-5, wherein moving old data comprises: reading, by the at least one processor, from the storage device, the old data; and writing, by the at least one processor, to the storage device, the old data stored to the other free blocks.

Clause 7. The method of any of clauses 1-6, wherein the record of free blocks further indicates whether each free block in the record of free blocks is available for storing snapshots or is currently associated with an existing snapshot.

Clause 8. The method of any of clauses 1-7, wherein: the old data is user data associated with a previous version of an operating system previously executing at the computing device, the new data is user data associated with a current version of the operating system currently executing at the computing device; and the method further comprising: responsive to detecting an anomaly with the current version of the operating system currently executing at the computing device: reverting, by the at least one processor, back to the previous version of the operating system; and restoring, by the at least one processor, the old data to the particular group of blocks by causing the storage device to replace the user data associated with the current version of the operating system with the user data associated with the previous version of the operating system.

Clause 9. The method of any of clauses 1-8, further comprising: prior to intercepting the write command, copying, by the at least one processor, based on a record of free blocks of the storage device, valid data stored at used blocks of the storage device to the one or more free blocks of the storage device, as the snapshot data.

Clause 10. A method comprising: intercepting, by at least one processor of a computing device, one or more trim commands output from a file system of the computing device to a storage device of the computing device; generating, by the at least one processor, based on the one or more trim commands, a record of free blocks of the storage device; and copying, by the at least one processor, based on the record of free blocks of the storage device, valid data stored at used blocks of the storage device to one or more free blocks of the storage device, as snapshot data.

Clause 11. The method of clause 10, further comprising: intercepting, by the at least one processor, a write command output from the file system, the write command specifying new data to be written to a particular group of blocks of the storage device; determining, based on the record of free blocks, that the particular group of blocks of the storage device include at least one of the one or more free blocks of the storage device that are currently storing the snapshot data as old data; responsive to determining that the particular group of blocks of the storage device include the at least one of the one or more free blocks of the storage device that are currently storing the snapshot data as old data, moving, by the at least one processor, the old data to other free blocks of the storage device; and after moving the old data to the other free blocks, forwarding, by the at least one processor, the write command to the storage device to cause the storage device to write the new data to the particular group of blocks.

Clause 12. The method of any of clauses 1-11, wherein the storage device is a solid-state storage device.

Clause 13. A computing device comprising means for performing the method of any of clauses 1-12.

Clause 14. A computing device comprising at least one processor configured to perform the method of any of clauses 1-12.

Clause 15. A computer-readable storage medium storing instructions that, when executed, cause at least one processor to perform the method of any of clauses 1-12.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A method, comprising:
   intercepting, by at least one processor, a write command output from a file system of a computing device, the write command specifying new data to be written to a particular group of blocks of a storage device of the computing device;
   determining, based on a record of free blocks of the storage device, that the particular group of blocks of the storage device include one or more free blocks of the storage device that are currently storing snapshot data as old data;
   responsive to determining that the particular group of blocks of the storage device include one or more free blocks of the storage device that are currently storing snapshot data as old data, moving, by the at least one processor, the old data to other free blocks of the storage device; and
   after moving the old data to the other free blocks, forwarding, by the at least one processor, the write command to the storage device to cause the storage device to write the new data to the particular group of blocks.

2. The method of claim 1, wherein the write command is a first write command, the method further comprising:
   restoring, by the at least one processor, the old data to the particular group of blocks by at least:
      obtaining, by the at least one processor, the old data from the other free blocks; and
      responsive to obtaining the old data from the other free blocks, outputting a second write command to the storage device to cause the storage device to write the old data to the particular group of blocks.

3. The method of claim 1, wherein the write command is a first write command, the method further comprising:
   after forwarding the first write command to the storage device, intercepting, by the at least one processor, a second write command output from the file system, the second write command specifying different new data to be written to a different group of blocks of the storage device; and
   responsive to determining, based at least in part on the record of free blocks, that the different group of blocks of the storage device does not include any free blocks of the storage device that are currently storing snapshot data as old data, forwarding, by the at least one processor, the second write command to the storage device to cause the storage device to write the different new data to the different group of blocks.

4. The method of claim 3, further comprising:
   responsive to determining, based on the record of free blocks, that the different group of blocks of the storage device does not include any free blocks of the storage device, forwarding, by the at least one processor, the second write command to the storage device to cause the storage device to write the different new data to the different group of blocks.

5. The method of claim 1, further comprising:
   intercepting, by the at least one processor, one or more trim commands output from the file system; and
   updating, by the at least one processor, based on the one or more trim commands, the record of free blocks to include any blocks identified in the trim command.

6. The method of claim 1, wherein moving the old data comprises:
   reading, by the at least one processor, from the storage device, the old data; and
   writing, by the at least one processor, to the storage device, the old data stored to the other free blocks.

7. The method of claim 1, wherein the record of free blocks further indicates at least one of:
   whether each free block in the record of free blocks is available for storing snapshots, or
   whether each free block in the record of free blocks is currently associated with an existing snapshot.

8. The method of claim 1,
wherein the old data is user data associated with a previous version of an operating system previously executing at the computing device, and
wherein the new data is user data associated with a current version of an operating system currently executing at the computing device,
the method further comprising:
responsive to detecting an anomaly with the current version of the operating system currently executing at the computing device:
reverting, by the at least one processor, back to the previous version of the operating system; and
restoring, by the at least one processor, the old data to the particular group of blocks by causing the storage device to replace the user data associated with the current version of the operating system with the user data associated with the previous version of the operating system.

9. The method of claim 1, further comprising:
prior to intercepting the write command, copying, by the at least one processor, based on a record of free blocks of the storage device, valid data stored at one or more used blocks of the storage device to the one or more free blocks of the storage device, as the snapshot data.

10. A method comprising:
intercepting, by at least one processor of a computing device, one or more trim commands output from a file system of the computing device to a storage device of the computing device;
generating, by the at least one processor, based on the one or more trim commands, a record of one or more free blocks of the storage device;
determining, by the at least one processor, valid data stored at used blocks of the storage device; and
copying, by the at least one processor, based on the record of one or more free blocks of the storage device, the valid data stored at used blocks of the storage device to the one or more free blocks of the storage device, as snapshot data.

11. The method of claim 10, further comprising:
intercepting, by the at least one processor, a write command output from the file system, the write command specifying new data to be written to a particular group of blocks of the storage device;
determining, based on the record of one or more free blocks, that the particular group of blocks of the storage device include at least one of the one or more free blocks of the storage device that are currently storing the snapshot data as old data;
responsive to determining that the particular group of blocks of the storage device include the at least one of the one or more free blocks of the storage device that are currently storing the snapshot data as old data, moving, by the at least one processor, the old data to other free blocks of the storage device; and
after moving the old data to the other free blocks, forwarding, by the at least one processor, the write command to the storage device to cause the storage device to write the new data to the particular group of blocks.

12. A computing device comprising:
a processor; and
a storage device, the storage device including a computer-readable storage medium having stored thereon instructions that, responsive to execution by the processor, cause the processor to execute operations comprising:
intercept a write command output from a file system of the computing device, the write command specifying new data to be written to a particular group of blocks of the storage device;
determine, based on a record of free blocks of the storage device, that the particular group of blocks of the storage device include one or more free blocks of the storage device that are currently storing snapshot data as old data;
responsive to determining that the particular group of blocks of the storage device include one or more free blocks of the storage device that are currently storing snapshot data as old data, move the old data to other free blocks of the storage device; and
after moving the old data to the other free blocks, forward the write command to the storage device to cause the storage device to write the new data to the particular group of blocks.

13. The computing device of claim 12,
wherein the write command is a first write command, and
wherein the instructions cause the processor to execute further operations to restore the old data to the particular group of blocks, wherein the operation to restore the old data to the particular group of blocks comprises the processor executing further operations to:
obtain the old data from the other free blocks; and
responsive to obtaining the old data from the other free blocks, output a second write command to the storage device to cause the storage device to write the old data to the particular group of blocks.

14. The computing device of claim 12,
wherein the write command is a first write command, and
wherein the instructions cause the processor to execute further operations to:
after forwarding the first write command to the storage device, intercept a second write command output from the file system, the second write command specifying different new data to be written to a different group of blocks of the storage device; and
responsive to determining, based at least in part on the record of free blocks, that the different group of blocks of the storage device does not include any free blocks of the storage device that are currently storing snapshot data as old data, forward the second write command to the storage device to cause the storage device to write the different new data to the different group of blocks.

15. The computing device of claim 14, wherein the instructions cause the processor to execute further operations to:
responsive to determining, based on the record of free blocks, that the different group of blocks of the storage device does not include any free blocks of the storage device, forward the second write command to the storage device to cause the storage device to write the different new data to the different group of blocks.

16. The computing device of claim 12, wherein the instructions cause the processor to execute further operations to:
intercept one or more trim commands output from the file system; and
update, based on the one or more trim commands, the record of free blocks to include any blocks identified in the one or more trim commands.

17. The computing device of claim 12, wherein the movement of the old data to other free blocks of the storage device comprises the processor executing further operations to:
  read the old data from the storage device; and
  write the old data stored to the other free blocks to the storage device.

18. The computing device of claim 12, wherein the record of free blocks further indicates at least one of:
  whether each free block in the record of free blocks is available for storing snapshots, or
  whether each free block in the record of free blocks is currently associated with an existing snapshot.

19. The computing device of claim 12,
  wherein the old data is user data associated with a previous version of an operating system previously executing at the computing device, and
  wherein the new data is user data associated with a current version of an operating system currently executing at the computing device,
  responsive to detecting an anomaly with the current version of the operating system currently executing at the computing device, the instructions cause the processor to execute further operations to:
    revert back to the previous version of the operating system; and
    restore the old data to the particular group of blocks by causing the storage device to replace the user data associated with the current version of the operating system with the user data associated with the previous version of the operating system.

20. The computing device of claim 12, wherein the instructions cause the processor to execute further operations to:
  prior to intercepting the write command, copy, based on a record of free blocks of the storage device, valid data stored at one or more used blocks of the storage device to the one or more free blocks of the storage device, as the snapshot data.

* * * * *